United States Patent
Lu et al.

(10) Patent No.: US 9,627,671 B2
(45) Date of Patent: Apr. 18, 2017

(54) FABRICATION METHOD FOR METAL BATTERY ELECTRODE WITH PYROLYZED COATING

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 366 days.

(21) Appl. No.: 14/193,782

(22) Filed: Feb. 28, 2014

(65) Prior Publication Data

US 2014/0178761 A1    Jun. 26, 2014

Related U.S. Application Data

(63) Continuation of application No. 14/193,501, filed on Feb. 28, 2014, now Pat. No. 9,406,919, which is a
(Continued)

(51) Int. Cl.
*H01M 4/04* (2006.01)
*H01M 2/16* (2006.01)
(Continued)

(52) U.S. Cl.
CPC .......... *H01M 2/1686* (2013.01); *C01B 17/02* (2013.01); *C01B 19/02* (2013.01); *C01B 25/003* (2013.01);
(Continued)

(58) Field of Classification Search
CPC ........ H01M 4/58; H01M 4/04; H01M 4/5825; H01M 2/1653; H01M 2/1686;
(Continued)

(56) References Cited

U.S. PATENT DOCUMENTS

| 3,562,003 A | 2/1971 | Martinsons |
| 2005/0044778 A1* | 3/2005 | Orr .......................... C10L 1/12 44/320 |

(Continued)

OTHER PUBLICATIONS

Z. Ogumi, M. Inaba, "Electrochemical lithium intercalation within carbonaceous materials: intercalation process, . . . ", Bull. Chem. Soc. Jpn., 71(1998) 521-534.

(Continued)

*Primary Examiner* — Emily Le
*Assistant Examiner* — Monique Wills
(74) *Attorney, Agent, or Firm* — Law Office of Gerald Maliszewski; Gerald Maliszewski

(57) ABSTRACT

A method is provided for forming a metal battery electrode with a pyrolyzed coating. The method provides a metallorganic compound of metal (Me) and materials such as carbon (C), sulfur (S), nitrogen (N), oxygen (O), and combinations of the above-listed materials, expressed as $Me_XC_YN_ZS_{XX}O_{YY}$, where Me is a metal such as tin (Sn), antimony (Sb), or lead (Pb), or a metal alloy. The method heats the metallorganic compound, and as a result of the heating, decomposes materials in the metallorganic compound. In one aspect, decomposing the materials in the metallorganic compound includes forming a chemical reaction between the Me particles and the materials. An electrode is formed of Me particles coated by the materials. In another aspect, the Me particles coated with a material such as a carbide, a nitride, a sulfide, or combinations of the above-listed materials.

14 Claims, 2 Drawing Sheets

Related U.S. Application Data continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | | |
|---|---|---|
| *H01M 4/58* | (2010.01) | |
| *C01C 3/12* | (2006.01) | |
| *H01M 4/136* | (2010.01) | |
| *H01M 4/62* | (2006.01) | |
| *H02J 7/00* | (2006.01) | |
| *H01M 4/134* | (2010.01) | |
| *H01M 4/1395* | (2010.01) | |
| *C01B 17/02* | (2006.01) | |
| *C01B 19/02* | (2006.01) | |
| *C01B 25/00* | (2006.01) | |
| *C01B 31/00* | (2006.01) | |
| *C01B 33/021* | (2006.01) | |
| *C01D 1/02* | (2006.01) | |
| *C01D 15/02* | (2006.01) | |
| *H01M 4/131* | (2010.01) | |
| *H01M 4/133* | (2010.01) | |
| *H01M 4/1391* | (2010.01) | |
| *H01M 4/38* | (2006.01) | |
| *H01M 4/485* | (2010.01) | |
| *H01M 4/505* | (2010.01) | |
| *H01M 4/56* | (2006.01) | |
| *H01M 4/587* | (2010.01) | |
| *H01M 10/054* | (2010.01) | |
| *H01M 10/0525* | (2010.01) | |
| *H01M 10/0565* | (2010.01) | |
| *H01M 4/1397* | (2010.01) | |
| *H01M 10/052* | (2010.01) | |

(52) U.S. Cl.
CPC ............ *C01B 31/00* (2013.01); *C01B 33/021* (2013.01); *C01C 3/12* (2013.01); *C01D 1/02* (2013.01); *C01D 15/02* (2013.01); *H01M 2/1653* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(58) Field of Classification Search
CPC . H01M 4/628; H01M 4/134; Y10T 29/49108; H02J 7/0042
See application file for complete search history.

(56) References Cited

U.S. PATENT DOCUMENTS

| | | | |
|---|---|---|---|
| 2006/0039850 A1* | 2/2006 | Jun ................. | B82Y 30/00 423/561.1 |
| 2006/0129215 A1* | 6/2006 | Helmus ............ | A61L 27/50 607/115 |
| 2012/0328936 A1* | 12/2012 | Wessells .......... | H01M 10/054 429/188 |

OTHER PUBLICATIONS

M.M. Doeff, Y. Ma, S.J. Visco, L.C. De Jonghe, Electrochemical insertion of sodium into carbon, Journal of the Electrochemical Society, 140(1993) L169-L170.

R. Alcántara, J.M. Jiménez-Mateos, P. Lavela, J. Tirado, Carbon black: a promising electrode material for sodium-ion batteries, Electrochem. Commun. 3 (2001) 639-642.

J.-S. Kim, G.-B. Cho, K.-W. Kim, J.-H. Ahn, G. Wang, H.-J. Ahn, Current Applied Physics, 11(2011)S215-S218.

X. Xia, J.R. Dahn, Study of the reactivity of Na/hard carbon with different solvents and electrolytes, Journal of the Electrochemical Society, 159 (2012) A515-A519.

V.L. Chevrier, G. Ceder, Challenges for Na-ion negative electrodes, Journal of the Electrochemical Society, 158 (2011) A1011-A1014.

L. Xiao et al., High capacity, reversible alloying reactions in SnSb/C nanocomposites for Na-ion battery applications, Chemical Communications, 48(2012)3321-3323.

Q. Sun, Q.-Q. Ren, H. Li, Z.-W. Fu, High capacity $Sb_2O_4$ thin film electrodes for rechargeable sodium battery, Electrochem. Commun., 13(2011)1462-1464.

Y. Kuroda, E. Kobayashi, S. Okada, J.-i. Yamaki, Electrochemical properties of spinel-type oxide anodes in sodium-ion battery 218th ECS meeting, abstract #389.

R. Alcántara et al., $NiCo_2O_4$ spinel: first report on a transition metal oxide for the negative electrode of sodium-ion batteries, Chem. Mater., 14(2002)2847-2848.

\* cited by examiner

FABRICATION METHOD FOR METAL BATTERY ELECTRODE WITH PYROLYZED COATING

RELATED APPLICATIONS

This application is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

which is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a method of fabricating metal particles with a pyrolyzed coating for battery anode applications.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^+$-ions can "rock" back and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode. In the meantime, electrons pass through an external circuit from the negative electrode to the positive electrode and generate electric power. During a charge, ions and electrons move along the reverse direction and go back to their original places.

Although LIBs have been successfully used, the conflict between lithium demand and its scarcity surges its cost, which hinders the further application of lithium-ion batteries on a large scale. Therefore, a low-cost rechargeable battery is urgently needed as an alternative to expensive LIBs. Under the circumstance, sodium-ion batteries are attracting attention because sodium has very similar properties to lithium, but a cheaper cost. Like lithium-ion batteries, sodium-ion batteries need $Na^+$-host materials as their electrode. Much effort has been expended to directly duplicate the $Li^+$-host structures, using $Na^+$-host electrode materials for the sodium-ion batteries. For example, $NaCoO_2$, $NaMnO_2$, $NaCrO_2$ and $Na_{0.85}Li_{0.17}Ni_{0.21}Mn_{0.64}O_2$, all having a layered-structure similar to $LiCoO_2$, have been developed for sodium-ion batteries. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$ and $Na_{1.5}VOPO_4F_{0.5}$, have also used as the positive electrode in sodium batteries.

Although sodium metal is a good choice for sodium-ion battery (SIB) anode, safety issues exist for commercial SIBs, such as flammability, dendrite growth during charge/discharge, and a low melting point. Therefore, efforts are being made to develop non-sodium anode materials for SIBs.

Currently, non-sodium metal anodes can be mainly put into two categories, carbonaceous materials and metals/metal chalcogenides (oxides and sulfides). Carbonaceous materials have three allotropes, which are diamond, graphite, and buckminsterfullerene [1]. In application to metal-ion batteries, only graphite and its disordered forms are practical materials as anode materials. Graphite typically has a layered structure into/from which lithium-ions can reversibly intercalate/deintercalate. But large sodium-ions and potassium-ions are hard to insert into the layered structure, which demonstrated a low capacity [2]. With certain treatments, carbonaceous materials become amorphous. Based on their crystalline structure, the amorphous carbon materials are classified as either "soft carbon" (graphitizable carbon) or "hard carbon" (non-graphitizable carbon). The amorphous carbon materials have demonstrated good performance as the anode material in SIBs. Carbon black, a kind of soft carbon, was reported as the anode materials in SIBs with sodium being reversibly inserted into its amorphous and non-porous structures [3]. Its reversible capacity was about 200 milliamp hours per gram (mAh/g), between 0-2 V vs. Na/Na$^+$. The carbon black materials have an almost negligible porosity, so researchers believe that the large external surface areas may facilitate a reaction with sodium.

Hard carbon was also investigated in SIBs [4]. The sodium intercalation in hard carbon can be considered to occur in two steps. In a high voltage range, sodium-ions insert into the parallel graphene layers. In a low voltage range, sodium-ions intercalate into the pores of hard carbon. Although the behavior of a hard carbon anode in the low voltage range is favorable for SIBs, its capacity is relatively low.

The other category, metals/metal chalcogenides are a very promising SIB anode material. According to calculation [5], every tin and lead molecule can alloy 3.75 sodium atoms, corresponding to 847 mAh/g and 485 mAh/g for tin and lead, respectively. In addition, a SnSb alloy was reported as the anode material for SIBs [6]. The material showed a reversible capacity of 544 mAh/g during charge/discharge. In 50 cycles, its capacity retention was 80%. Aside from metals, Sun, et al., reported a $Sb_2O_4$ thin film as a SIB anode [7]. It exhibited a large reversible capacity of 896 mAh/g that originated from the alloying/dealloying and oxidation/reduction processes of antimony. Like $Sb_2O_4$, spinel materials of $Co_3O_4$ and $Li_4Ti_5O_{12}$ showed a very similar behavior [8]. These materials in half cells with sodium counter electrodes had the discharge voltage of ~0.5V and charge voltage of ~1.0 V. The reversible capacity of $Co_3O_4$ was about 350 mAh/g, and that of $Li_4Ti_5O_{12}$ was about 100 mAh/g. $NiCo_2O_4$ is another choice as a SIB anode [9]. Sodium-ions reacted with the material from 1.2V to 0V vs. Na/Na$^+$, and were removed from it between 0.3V and 1.5 V vs. Na/Na$^+$. Its reversible capacity was ~200 mAh/g. In addition to oxides, $Ni_3S_2$ was also developed for SIBs anode [10]. It was discharged from ~1.1 V to 0.3V and charged from 1V to 1.8V vs. Na/Na$^+$. Its reversible capacity was around 250 mAh/g.

Basing on the aforementioned studies, it is known that tin (Sn), antimony (Sb), and lead (Pb) exhibit high capacities when used in the anodes of sodium-ion batteries. However, the alloying process causes large volume changes, which pulverizes the metal electrodes and degrades the battery performance. The same pulverization process occurs with potassium-ion batteries.

It would be advantageous to develop metal anodes, for use in batteries, whose volume remains stable during battery charge and discharge processes.

[1] Z. Ogumi, M. Inaba, Electrochemical lithium intercalation within carbonaceous materials: intercalation process, surface film formation, and lithium diffusion, Bull. Chem. Soc. Jpn., 71 (1998) 521-534.

[2] M. M. Doeff, Y. Ma, S. J. Visco, L. C. De Jonghe, Electrochemical insertion of sodium into carbon, Journal of the Electrochemical Society, 140 (1993) L169-L170.

[3] R. Alcántara, J. M. Jiménez-Mateos, P. Lavela, J. Tirado, Carbon black: a promising electrode material for sodium-ion batteries, Electrochem. Commun. 3 (2001) 639-642.

[4] X. Xia, J. R. Dahn, Study of the reactivity of Na/hard carbon with different solvents and electrolytes, Journal of the Electrochemical Society, 159 (2012) A515-A519.

[5] V. L. Chevrier, G. Ceder, Challenges for Na-ion negative electrodes, Journal of the Electrochemical Society, 158 (2011) A1011-A1014.

[6] L. Xiao, Y. Cao, J. Xiao, W. Wang, L. Kovarik, Z. Mie, J. Liu, High capacity, reversible alloying reactions in SnSb/C nanocomposites for Na-ion battery applications, Chemical Communications, 48 (2012) 3321-3323.

[7] Q. Sun, Q.-Q. Ren, H. Li, Z.-W. Fu, High capacity $Sb_2O_4$ thin film electrodes for rechargeable sodium battery, Electrochem. Commun., 13 (2011) 1462-1464.

[8] Y. Kuroda, E. Kobayashi, S. Okada, J. Yamaki, Electrochemical properties of spinel-type oxide anodes in sodium-ion battery, 218th ECS meeting, abstract #389.

[9] R. Alcántara, M. Jaraba, P. Lavela, J. L. Tirado, $NiCo_2O_4$ spinel: first report on a transition metal oxide for the negative electrode of sodium-ion batteries, Chem. Mater., 14 (2002) 2847-2848.

[10] J.-S. Kim, G.-B. Cho, K.-W. Kim, J.-H. Ahn, G. Wang, H.-J. Ahn, Current Applied Physics, 11 (2011) S215-S218.

SUMMARY OF THE INVENTION

Disclosed herein is process for fabricating anodes, for use in batteries, made from metallorganic compounds. The method obtains coated metals with small particle sizes in a single process step. In one aspect, the small particle size and coating layer mitigate against volume changes and pulverization of the anode during the charge and discharge of batteries. In another aspect, the particles may be metal carbides, nitrides, and sulfides that form during pyrolysis, depending on the compositions of the precursors.

Accordingly, a method is provided for forming a metal battery electrode with a pyrolyzed coating. The method provides a metallorganic compound of metal (Me) and materials such as carbon (C), sulfur (S), nitrogen (N), oxygen (O), and combinations of the above-listed materials, expressed as $Me_XC_YN_ZS_{XX}O_{YY}$;

where Me is a metal such as tin (Sn), antimony (Sb), lead (Pb), a combination of the above-listed metals, or a metal alloy;

where x is greater than 0;

where y is greater than 0;

where z is greater than or equal to 0;

where xx is greater than or equal to 0;

where yy is greater than or equal to 0;

The method heats the metallorganic compound, and as a result of the heating, decomposes materials in the metallorganic compound. In one aspect, decomposing the materials in the metallorganic compound includes forming a chemical reaction between the Me particles and the materials. An electrode is formed of Me particles coated by the materials. In another aspect, the Me particles are coated with a material such as a carbide, a nitride, a sulfide, or combinations of the above-listed materials. In one aspect, the material coated Me particles are formed on a metal current collector.

The metallorganic compound may be heated in an atmosphere of inert gases or an atmosphere including a reducing agent such as hydrogen-containing nitrogen, ammonia-containing nitrogen, hydrogen-containing argon, or ammonia-containing argon.

Additional details of the above-described method and a method for forming metal particles with a pyrolyzed coating are presented below.

DETAILED DESCRIPTION

Figure 1:
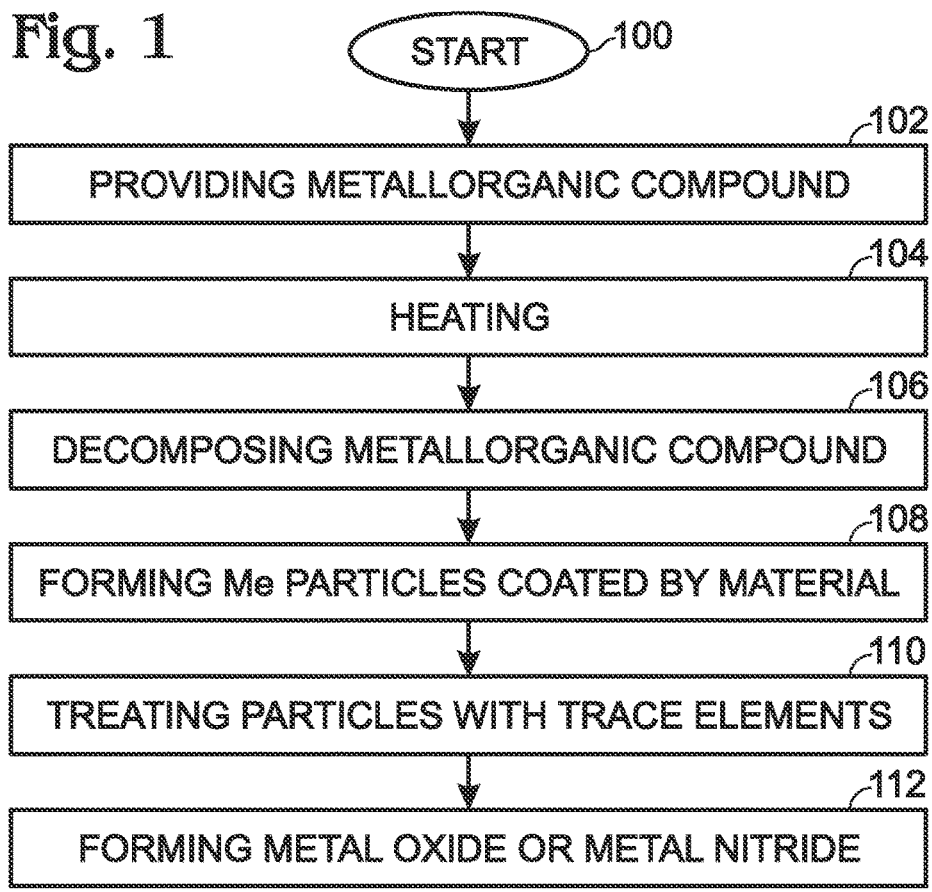
FIG. 1 is a flowchart illustrating a method for forming a metal battery electrode with a pyrolyzed coating.

FIG. 1 is a flowchart illustrating a method for forming a metal battery electrode with a pyrolyzed coating. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 100.

Step 102 provides a metallorganic compound of metal (Me) and a material that may be carbon (C), sulfur (S), nitrogen (N), oxygen (O), or combinations of the above-listed materials, expressed as $Me_XC_YN_ZS_{XX}O_{YY}$.

Me is a metal, such as tin (Sn), antimony (Sb), lead (Pb), combinations of the above-listed metals, or a metal alloy. A metal alloy is defined as Sn, Sb, or Pb (or a combination of these metals) combined with another, unmentioned metal.

The variables listed above are defined as follows:
x is greater than 0;
Y is greater than 0;
z is greater than or equal to 0;
xx is greater than or equal to 0; and,
YY is greater than or equal to 0;

In one aspect, Step 102 provides a plurality of metallorganic compounds with independent definitions of Me, x, y, z, xx, and yy.

Step 104 heats the metallorganic compound, using for example, a furnace, a laser, microwave, or plasma (sputtering) energy source. The metallorganic compound is typically heated at a temperature in the range of 200 to 2500 degrees C.

As a result of the heating in Step 104, Step 106 decomposes materials in the metallorganic compound. Step 108 forms an electrode comprising Me particles coated by the materials. Typically, the particles have a diameter in the range of 1 nanometer and 500 microns. In one aspect, forming the electrode in Step 108 includes forming the Me particles coated by the materials on a metal current collector. The electrode may be used, for example, as the anode in a sodium or potassium ion battery.

In another aspect subsequent to forming the electrode in Step 108, Step 110 treats the Me particles coated by the material with trace elements of oxidants or nitrogen. Then, Step 112 forms an end product, respectfully, of metal oxides or metal nitrides (in addition to the materials formed in Step 110).

In one aspect, heating the metallorganic compound in Step 104 includes heating the metallorganic compound in an atmosphere of inert gases or an atmosphere including a reducing agent, for example, hydrogen-containing nitrogen, ammonia-containing nitrogen, hydrogen-containing argon, or ammonia-containing argon.

In one aspect, decomposing materials in the metallorganic compound in Step 106 includes forming a chemical reaction between the Me particles and the materials. As a result, in Step 108 the Me particles may be coated with a material such as a carbide, a nitride, a sulfide, or combinations of the above-listed materials.

In another aspect, heating the metallorganic compound in Step 104 includes reducing the heating time from a first duration to a second duration. Then, forming the electrode comprising Me particles coated by the materials in Step 108 includes reducing the size of the Me particles coated by the materials from a first size, to a second size in response to the second duration of time.

In one explicit example, Step 102 provides a metallorganic compound where Me is a tin (Sn), comprising one of the following exemplary precursors:

tin 2-ethylhexanoate, tin bis(acetylacetonate)dichloride, tin bis(acetylacetonate)dibromide, tin oxalate, tin tert-butoxide, tin acetylacetonate, tin stearate, tetrakis(dimethylamido) tin, tin phthalocyanine oxide, tin phthocyanine, tin ionophore, tin 2,3-naphthalocyanine, tin 2,3-naphthalocyanine dichloride/dibromide, tributyl(vinyl) tin, trimethyl(phenyl) tin, tributyl (phenylethynyl) tin, tributyl (1-ethoxyvinyl) tin, bis[bis(trimethylsilyl)amino]tin, tributyl (1-propynyl) tin, tributyl (3-methyl-2-butenyl) tin, tetrakis(diethylamido) tin, trimethyl (phenylethynyl) tin, butyl (1-propenyl) tin, dioctyl (maleate) tin, tetramethyl tin, tetrabutyl tin, tetraphenyl tin, (trimethyl stannyl)acetylene, stannane, (nitrophenyl) tin oxide, ethylhexanoyloxy-thrimethylhexyl-tin, tetrakis(hydroxyphenyl) tin, tetrakis(chlorophenyl) tin, tetrakis(tolyl) tin, tetrakis(pentafluorophenyl) tin, tetrakis(triphenylsilyl) tin, tetrakis(triphenyl stannyl) tin, triphenyl tin, triphenyl (triphenyl methyl) tin, tributyl tin chloride, trimethyltin chloride, tributyl tin, dimethyltin dichloride, dibutyltin dichloride, cyhexatin, diphenyltin dichloride, tetraethyl tin, (tributyl tin) oxide, tributyl tin methoxide, butyltin trichloride, dibutylin oxide, triphenyltin hydroxide, fentin, dibutyl dimethoxytin, butyltin oxide, tributyltin fluoride and its polymer, tricyclohexyltin chloride, and dibutyl chlorotin oxide. Note: this is not an exhaustive list of possible tin precursors, as other precursors exist including at least the elements of tin, with carbon, sulfur, or nitride elements.

As another example, Step 102 provides a metallorganic compound where Me is antimony (Sb), comprising one of the following exemplary precursors:

antimony acetate, potassium antimony tartrate, antimony ethoxide, antimony methoxide, antimony isopropoxide, antimony propoxide, (dimethylamido)antimony, triphenylantimony, dichlorotris(4-bromophenyl)antimony, (naphthyl)antimony, ((trifluoromethyl)phenyl)-antimony, ((diethylamino)phenyl)antimony, bromophenyl antimony, dibenzofuryl antimony, tolyl antimony, triphenylantimony dichloride, and antimony phtealocyanine. Note: this is not an exhaustive list of possible antimony precursors, as other precursors exist including at least the elements of antimony, with carbon, sulfur, or nitride elements.

As a third example, Step 102 may provide a metallorganic compound where Me is lead (Pb), comprising one of the following exemplary precursors:

lead acetate, lead subacetate, lead citrate, lead phthalocyanine, lead methanesulfonate, lead acetylacetonate, lead tetrakis(4-cumylphenoxy)phthalocyanine, lead ionophore, Bis(2,2,6,6-tetramethyl-3,5-heptanedionato)lead, triphenyl (phenylethynyl)lead, lead 2-hydroxy-2-methylpropionate, benzyl tri(p-tolyl)lead, bis-(ethyl thio)lead, hexadecyl thio lead, (methyl thio) lead, chlorodiphenyl (4-pentenyl) lead, chloro tris(4-chlorophenyl) lead, chloro tris(4-methoxyphenyl) lead, di(2-furyl)bis(4-methoxyphenyl) lead, diphenyldi (1-pyrrolyl) lead, diphenyldi(p-tolyl) lead, iodo tris(mesityl) lead, and terakis(2-methoxyphenyl) lead). Note: this is not an exhaustive list of possible lead precursors, as other precursors exist including at least the elements of lead, with carbon, sulfur, or nitride elements.

Figure 2:
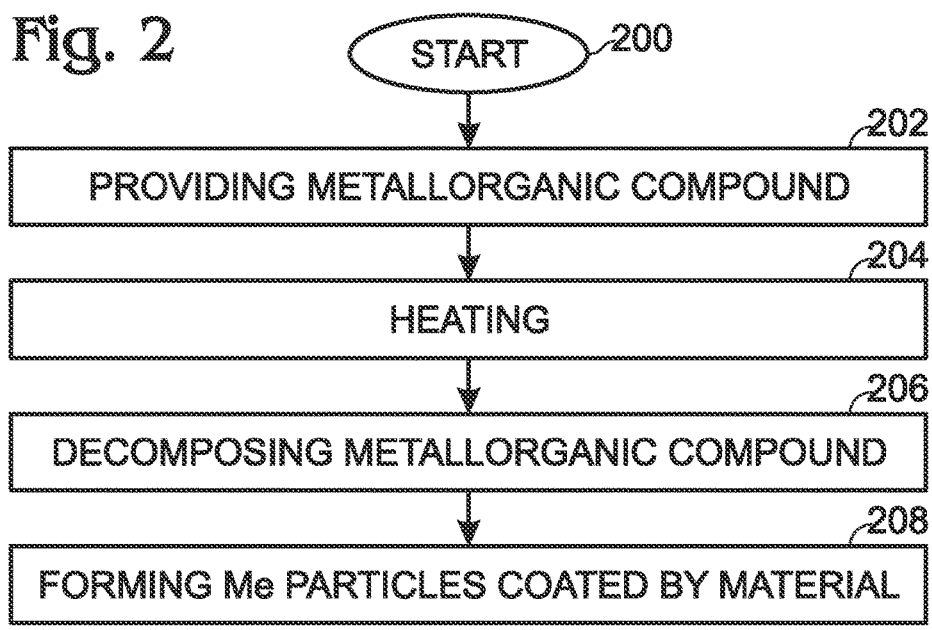
FIG. 2 is a flowchart illustrating a method for forming metal particles with a pyrolyzed coating.

FIG. 2 is a flowchart illustrating a method for forming metal particles with a pyrolyzed coating. The method begins at Step 200. Step 202 provides a metallorganic compound of Me and materials such as carbon, sulfur, nitrogen, oxygen, and combinations of the above-listed materials, expressed as $Me_XC_YN_ZS_{XX}O_{YY}$;

where Me is selected from a group consisting of metals and metal alloys:
where X is greater than 0;
where Y is greater than 0;
where Z is greater than or equal to 0;
where XX is greater than or equal to 0; and,
where YY is greater than or equal to 0.

Examples of particular metals, metal precursors, and the use of a plurality of metallorganic compounds have been presented above in the explanation of Step 102, and they are not repeated here in the interest of brevity.

Step 204 heats the metallorganic compound. Again, temperature, atmosphere, and energy source details of heating process have been presented above in the explanation of Step 104, and are therefore not repeated. As a result of the heating in Step 204, Step 206 decomposes materials in the metallorganic compound. Step 208 forms Me particles coated by the materials.

In one aspect, decomposing materials in the metallorganic compound in Step 206 includes forming a chemical reaction between the Me particles and the materials. As a result, Step 208 may form Me particles coated with a material such as a carbide, a nitride, a sulfide, or combinations of the above-listed materials.

As noted in Wikipedia, pyrolysis is a thermochemical decomposition of organic material at elevated temperatures, typically in the absence of oxygen (or any halogen). It involves the simultaneous change of chemical composition and physical phase, and is irreversible. Pyrolysis is a type of thermolysis, and is most commonly observed in organic materials exposed to high temperatures. In general, the pyrolysis of organic substances produces gas and liquid products, and leaves a solid residue richer in carbon content. In the case of the above-described methods, pyrolysis may leave a residue including sulfur and nitrogen. Pyrolysis differs from other high-temperature processes like combustion and hydrolysis in that it does not always involve reactions with oxygen, water, or any other reagents.

As noted above, the precursors are pyrolyzed at a temperature in the range of 200 to 2500° C. under inner or reductive atmospheres. The inert atmospheres can be nitrogen or argon. The reductive atmosphere can be hydrogen or ammonia-containing nitrogen or argon. The pyrolysis can be carried out by thermal (furnace), laser, microwave, or plasma treatment. As a result of pyrolysis, chemical interaction may exist between the metal particles and carbon, sulfur, or oxide layers. Depending on the precursor composition and treatment conditions, carbides, nitrides, or sulfides may form during the process. These products can prevent metal electrodes from pulverization during battery charge/discharge. The metal electrode materials can be post-treated by trace oxidants or nitrogen-containing material to form metal oxides or nitrides.

In general, the metallorganic compounds mainly consist of metal ions, carbon, nitrogen, oxygen and sulfur, as expressed as $Me_XC_YN_ZS_{XX}O_{YY}$. Aside from these elements, the metallorganic compounds may also include silicon, phosphorus, halogens, boron, and germanium, etc. Heated at a certain temperature, these compounds decompose to metals, carbon, carbides, nitrides, sulfides, and so on under an inert or reductive agent-including atmosphere. For example, cobalt phthalocyanine decomposes above to 780° C. under nitrogen flow.

In battery applications, metals and alloys of tin, antimony, and lead are conventionally used as anode materials. For instance, as an anode material in sodium-ion batteries, tin can alloy with sodium to form $Na_{3.75}Sn$. Its theoretical capacity is 846 mAh/g, much higher than that of hard carbon. The sodiation process can be expressed as:

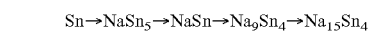

(Ref. V. L. Chevrier, G. Ceder, Challenges for Na-ion Negative Electrodes, J. Electrochem. Soc., 158 (2011) A1011-A1014)

However, the alloying process causes volume changes of about 400% in the metal anode materials. After several cycles of sodiation/desodiation, the metal anode materials pulverize and lose their capability to host sodium. As a result, carbon coated SnSb was developed for a sodium-ion battery (Ref. L. Xiao, et al. High capacity, reversible alloying reactions in SnSb/C nanocomposites for Na-ion battery applications, Chem. Commun., 48 (2012)$_{3321}$-3323). The occurrence of Sb with a carbon coating mitigated against the volume change of Sn, which demonstrated a better cyclability. Conventionally, metal-carbon composites are obtained with a ball-milling process. Carbon and metal particles are put into a container and to form carbon coated metal particles using high-energy mechanical milling equipment. However, the interaction between carbon layers and metal particles is weak.

Electrode materials pyrolyzed from metallorganic compounds (MC) have two advantages over the ball-milling method.

(1) With pyrolysis, the Me particles are surrounded by elements of C/N/S. As soon as the MC decomposes at a high temperature, Me is immediately coated by C/N/S. As a result, the Me particle size is smaller than that obtained from the ball-milling method.

(2) The ball-milling process requires two steps to obtain N/C/S coated Me particles. The first step is to form small metal/alloy particles. The second step is to coat these particles with carbon or other elements. In contrast, the N/C/S coated Me particles obtained by pyrolysis are formed in a single step of heating the MC.

In addition, it is very possible that a strong interaction between Me and C/N/S exists, even though the MC is heat-treated. It is believed by some researchers that pyrolysis forms a chemical bond between the Me and C/N/S. However, with the ball-milling, carbon is merely mechanically coated on Me, which causes a weak Me/C interaction.

In order to obtain pyrolysis derived coating composites, a facile or readily occurring method is used. The metallorganic compounds are put into the chamber of a furnace, or exposed to laser, microwave, or plasma energy. Using an inert or reductive atmosphere, the metallorganic compounds decompose to carbon coated metals, carbides, nitrides, and so on at a certain temperature. Controlling the temperature and process time, the particle sizes of the composites can be controlled from 1 nanometer (nm) to several microns. Under some circumstances, chemical interaction between metals and carbon occurs, forming a strong adhesion of carbon, sulfur, or nitrogen layers on the metal particles to effectively retard the metals' expansion during battery charge/discharge.

Figure 3A:
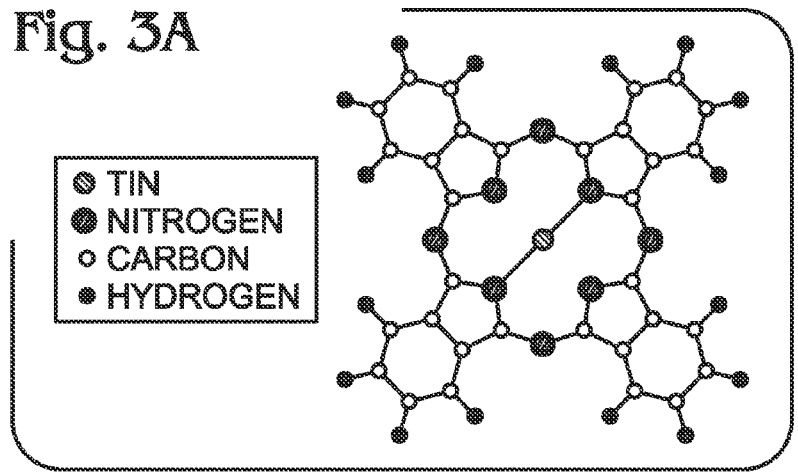
FIGS. 3A and 3B are schematic drawings depicting the pyrolysis process.
Figure 3B:
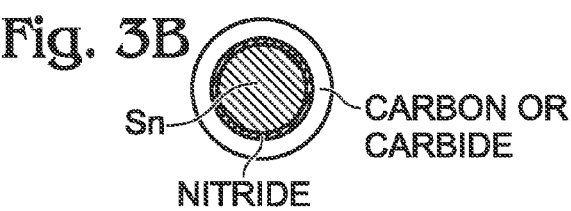

FIGS. 3A and 3B are schematic drawings depicting the pyrolysis process. Tin phthalocyanine is a macrocycle complex. Its structure is shown in FIG. 3A. Tin is located at the molecule center and is surrounded by nitrogen. Outside the nitrogen, there are carbon and hydrogen atoms. In a nitrogen atmosphere, the compound is heated in a furnace in a temperature range of 300-1200° C., and carbon coated tin is obtained, as shown in FIG. 3B. To obtain a smaller particle of carbon coated Sn, a shorter heating time is used. Using similar processes, carbon, sulfur, or nitrogen coated metal alloys can also be obtained. The precursors of metallorganic compounds containing different metals, for example, Sn and Sb, may be mixed together, and then heat-treated at high temperature, to obtain coated SnSb particles. The coated metals or alloys can be used as the anode materials in sodium or potassium ion batteries.

Figure 4:
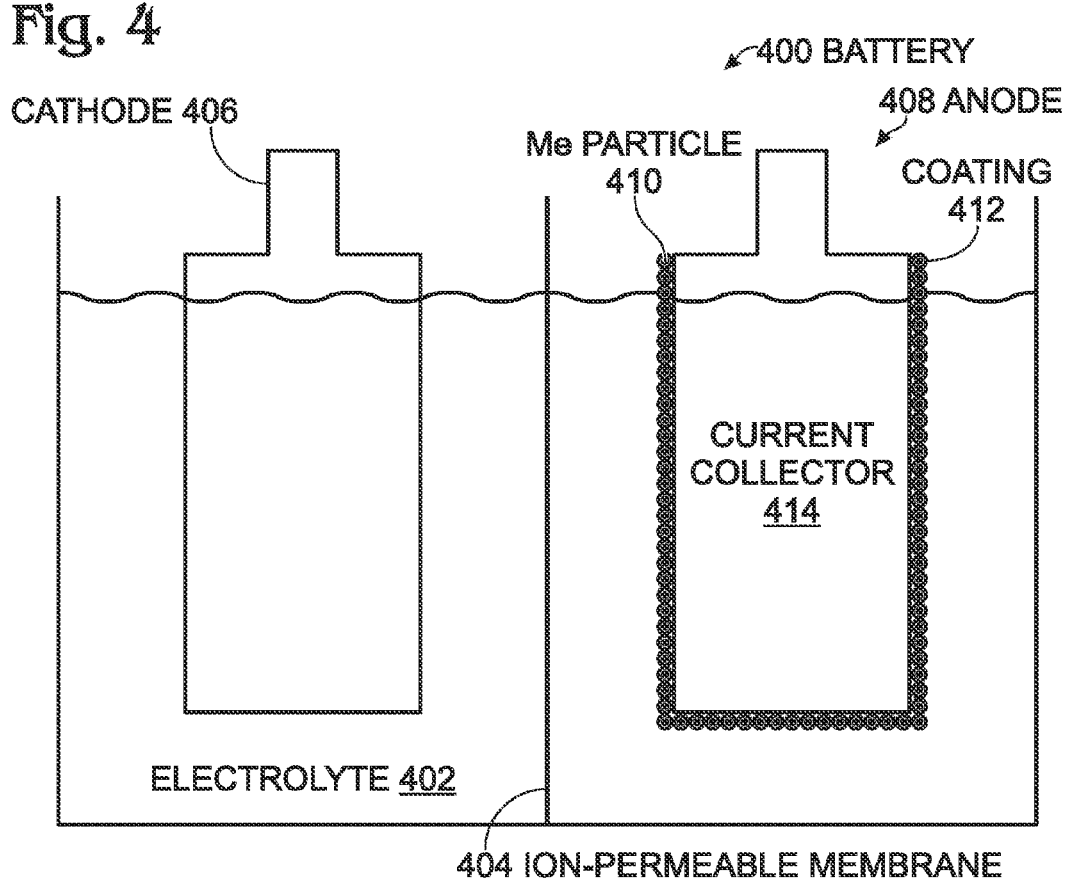
FIG. 4 is a partial cross-sectional view of a battery.

FIG. 4 is a partial cross-sectional view of a battery. The battery 400 comprises an electrolyte 402, an ion-permeable membrane 404, and a cathode 406. The cathode 406 may be an oxide, sulfide, phosphate material. Some examples of oxides include $LiCoO_2$, $LiFePO_4$, $LiNiO_2$, and $LiMn_2O_4$. One example of a sulfide includes $TiS_2$. Some examples of phosphates include $Na_2PO_4F$, $NaVPO_4F$, and $Na_{1.5}VOPO_4F_{0.5}$. In one aspect, the cathode 406 is a cyanometallate comprising an active material $A_B M1_C M2_D (CN)_E \cdot FH_2O$;

where "A" is selected from a first group of metals;
where M1 and M2 are transition metals;
where B is less than or equal to 6;
where C is less than or equal to 4;
where D is less than or equal to 4;
where E is less than or equal to 10; and,
where F is less than or equal to 20.

The battery 400 also comprises an anode 408, which in turn comprises metal (Me) particles 410 formed from metals or metal alloys, with a coating 412 formed over the Me particles 410. The coating 412 is formed from materials such as carbon (C), sulfur (S), nitrogen (N), oxygen (O), or combinations of the above-listed materials, expressed as $C_Y N_Z S_{XX} O_{YY}$;

where Y is greater than 0;
where Z is greater than or equal to 0;
where XX is greater than or equal to 0; and,
where YY is greater than or equal to 0.

The Me particle 410 with coating 412 is shown formed on a conductive current collector 414. A polymeric binder such as polytetrafluoroethylene (PTFE) or polyvinylidene difluoride (PVDF) may be used to provide adhesion between the Me particles 410 with coating 412 and the current collector 414 to improve the overall physical stability.

In one aspect, the materials of the coating 412 are a carbide, a nitride, a sulfide, or combinations of the above-listed materials. Typically, the Me particles 410 are tin (Sn), antimony (Sb), lead (Pb), or combinations of the above-listed metals. In the case of the cyanometallate cathode, "A" is typically an alkali metal, alkaline metal, or combinations of the above-listed metals. More explicitly, the first group of metals may be comprised of lithium (Li), sodium (Na), potassium (K), rubidium (Rb), cesium (Cs), calcium (Ca), magnesium (Mg), or combinations thereof. M1 and M2 are each independently derived—they can be the same or a different transition metal, and are typically one of the following: titanium (Ti), vanadium (V), chromium (Cr), manganese (Mn), iron (Fe), cobalt (Co), nickel (Ni), copper (Cu), zinc (Zn), Ca, and Mg. In another aspect, at least one the variables Z, XX, and YY is greater than zero, when Y is greater than zero. That is, when the materials of the coating 412 include carbon, they additionally include S, N, O, or combinations of S, N, and O.

The battery electrolyte 402 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene)oxide (PEO) and fluorinated polymers such as poly(vinylidene)fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. Typically, the battery includes an ion-permeable membrane 404 separating the cathode 406 from the anode 408. In some instances, the ion-permeable membrane and the electrolyte can be the same material, as may be the case for polymer gel, polymer, and solid electrolytes.

A pyrolysis process has been presented for fabricating coated metal particles for use as an anode in a battery. Examples of particular materials and process steps have been presented to illustrate the invention. However, the invention is not limited to merely these examples. Other variations and embodiments of the invention will occur to those skilled in the art.

We claim:

1. A method for forming a metal battery electrode with a pyrolyzed coating, the method comprising:
providing a metallorganic compound of metal (Me) and materials selected from a group consisting of carbon (C), sulfur (S), nitrogen (N), oxygen (O), and combinations of the above-listed materials, expressed as $Me_X C_Y N_Z S_{XX} O_{YY}$;
where Me is selected from a group consisting of metals and metal alloys;
where X is greater than 0;
where Y is greater than 0;
where Z is greater than or equal to 0;
where XX is greater than or equal to 0;
where YY is greater than or equal to 0;
heating the metallorganic compound;
as a result of the heating, decomposing materials in the metallorganic compound, forming a chemical reaction between the Me particles and the materials; and,
forming an electrode comprising Me particles coated by materials selected from a group consisting of a carbide, a nitride, a sulfide, and combinations of the above-listed materials.

2. The method of claim 1 wherein heating the metallorganic compound includes heating the metallorganic compound in an atmosphere selected from a group consisting of inert gases and an atmosphere including a reducing agent.

3. The method of claim 2 wherein the atmosphere including the reducing agent is selected from a group consisting of hydrogen-containing nitrogen, ammonia-containing nitrogen, hydrogen-containing argon, and ammonia-containing argon.

4. The method of claim 1 wherein heating the metallorganic compound includes heating with an energy source selected from a group consisting of a furnace, a laser, microwave, and plasma.

5. The method of claim 1 wherein providing the metallorganic compound includes providing an Me source selected from a group consisting of tin (Sn), antimony (Sb), lead (Pb), and combinations of the above-listed metals.

6. The method of claim 1 further comprising:
subsequent to forming the electrode comprising Me particles coated by the materials, treating with trace elements selected from a group consisting of oxidants and nitrogen; and,
forming an end product respectfully selected from a group consisting of metal oxides and metal nitrides.

7. The method of claim 1 wherein forming the electrode includes forming the Me particles coated by the materials on a conductive current collector.

8. The method of claim 1 wherein forming the electrode comprising Me particles coated by the materials includes forming particles having a diameter in a range of 1 nanometer and 500 microns.

9. The method of claim 1 wherein providing the metallorganic compound includes providing a metallorganic compound where Me is a tin (Sn), comprising a precursor selected from a group consisting of tin 2-ethylhexanoate, tin bis(acetylacetonate) dichloride, tin bis(acetylacetonate) dibromide, tin oxalate, tin tert-butoxide, tin acetylacetonate, tin stearate, tetrakis (dimethylamido) tin, tin phthalocyanine oxide, tin phthocyanine, tin ionophore, tin 2,3-naphthalocyanine, tin 2,3-naphthalocyanine dichloride/dibromide, tributyl(vinyl) tin, trimethyl(phenyl) tin, tributyl (phenylethynyl) tin, tributyl (1-ethoxyvinyl) tin, bis[bis(trimethylsilyl)amino] tin, tributyl (1-propynyl) tin, tributyl (3-methyl-2-butenyl) tin, tetrakis (diethylamido) tin, trimethyl (phenylethynyl) tin, butyl (1-propenyl) tin, dioctyl (maleate) tin, tetramethyl tin, tetrabutyl tin, tetraphenyl tin, (trimethyl stannyl) acetylene, stannane, (nitrophenyl) tin oxide, ethylhexanoyloxy-thrimethylhexyl-tin, tetrakis (hydroxyphenyl) tin, tetrakis(chlorophenyl) tin, tetrakis (tolyl) tin, tetrakis (pentafluorophenyl) tin, tetrakis (triphenylsilyl) tin, tetrakis (triphenyl stannyl) tin, triphenyl tin, triphenyl (triphenyl methyl) tin, tributyl tin dichloride, trimethyltin chloride, tributyl tin, dimethyltin dichloride, dibutyltin dichloride, cyhexatin, diphenyltin dichloride, tetraethyl tin, (tributyl tin) oxide, tributyl tin methoxide, butyltin trichloride, dibutylin oxide, triphenyltin hydroxide, fentin, dibutyl dimethoxytin, butyltin oxide, tributyltin fluoride and its polymer, tricyclohexyltin chloride, and dibutyl chlorotin oxide.

10. The method of claim 1 wherein providing the metallorganic compound includes providing a metallorganic compound where Me is antimony (Sb), comprising a precursor selected from a group consisting of antimony acetate, potassium antimony tartrate, antimony ethoxide, antimony methoxide, antimony isopropoxide, antimony propoxide, (dimethylamido)antimony, triphenylantimony, dichlorotris (4-bromophenyl)antimony, (naphthyl) antimony, ((trifluoromethyl)phenyl)-antimony, ((diethylamino)phenyl)antimony, bromophenyl antimony, dibenzofuryl antimony, tolyl antimony, triphenylantimony dichloride, and antimony phtealocyanine.

11. The method of claim 1 wherein providing the metallorganic compound includes providing a metallorganic compound where Me is lead (Pb), comprising a precursor selected from a group consisting of lead acetate, lead subacetate, lead citrate, lead phthalocyanine, lead methanesulfonate, lead acetylacetonate, lead tetrakis (4-cumylphenoxy) phthalocyanine, lead ionophore, Bis(2,2,6,6-tetramethyl-3,5-heptanedionato)lead, triphenyl(phenylethynyl)lead, lead 2-hydroxy-2-methylpropionate, benzyl tri(p-tolyl)lead, bis-(ethyl thio)lead, hexadecyl thio lead, (methyl thio) lead, chlorodiphenyl (4-pentenyl) lead, chloro tris (4-chlorophenyl) lead, chloro tris(4-methoxyphenyl) lead, di(2-furyl) bis(4-methoxyphenyl) lead, diphenyldi (1-pyrrolyl) lead, diphenyldi (p-tolyl) lead, iodo tris (mesityl) lead, and terakis (2-methoxyphenyl) lead).

12. The method of claim 1 wherein heating the metallorganic compound includes heating at a temperature in a range of 200 to 2500 degrees C.

13. The method of claim 1 wherein providing the metallorganic compound includes providing a plurality of metallorganic compounds with independent definitions of Me, x, y, z, xx, and yy.

14. The method of claim 1 wherein heating the metallorganic compound includes reducing the heating time from a first duration to a second duration; and,
wherein forming the electrode comprising Me particles coated by the materials includes reducing a size of the Me particles coated by the materials from a first size, to a second size in response to the second duration of time.

* * * * *

UNITED STATES PATENT AND TRADEMARK OFFICE
CERTIFICATE OF CORRECTION

PATENT NO. : 9,627,671 B2
APPLICATION NO. : 14/193782
DATED : April 18, 2017
INVENTOR(S) : Lu et al.

It is certified that error appears in the above-identified patent and that said Letters Patent is hereby corrected as shown below:

On the Title Page

Item (63), in the RELATED U.S. APPLICATION DATA Section, reads:
"Continuation of application No. 14/193,501 (Pat No. 9,406,919)."
Should read:
"Continuation-in-part of application No. 14/193,501 (Pat No. 9,406,919).".

In the Claims

In Column 11, Line 43 (Claim 9) reads:
"tributyl tin dichloride"
Should read:
"tributyl tin chloride".

Signed and Sealed this
Tenth Day of July, 2018

Andrei Iancu
*Director of the United States Patent and Trademark Office*